March 29, 1966  A. A. VUYLSTEKE  3,243,724
METHOD OF OPERATING A LASER BY CONTROLLING
REGENERATIVE ACTION
Filed Jan. 9, 1963

INVENTOR.
Arthur A. Vuylsteke
BY
Paul J. Ethington
ATTORNEY

United States Patent Office 3,243,724
Patented Mar. 29, 1966

3,243,724
METHOD OF OPERATING A LASER BY CONTROLLING REGENERATIVE ACTION
Arthur A. Vuylsteke, Santa Barbara, Calif., assignor to General Motors Corporation, Detroit, Mich., a corporation of Delaware
Filed Jan. 9, 1963, Ser. No. 250,250
3 Claims. (Cl. 331—94.5)

This invention relates to a solid state optical maser, more commonly denoted laser. More particularly, the invention relates to a novel implementation and method of operation for a laser which is effective to increase the power output and decrease the pulse width of the output beam by varying the regenerative condition of the laser chamber at predetermined times.

A great portion of the development in the field of lasers has been directed toward solid state devices employing a ruby or other doped rod as the active element. A laser system basically comprises the combination of an active material which is capable of producing stimulated emission of radiation, a pumping source which is effective to raise the energy level of ions within the active material, and a resonant structure which is effective to produce a regenerative action in the stimulation of radiation from the ion excited by the pumping source.

A recent development in the art has yielded what is known as the pulsed reflection mode of laser operation. To implement this mode of laser operation, at least one end of a ruby rod is left unsilvered so as to couple out a maximum percentage of the light wave. A resonant chamber is defined by silvering or otherwise rendering reflective one end of the rod and placing at the opposite end of the rod and perpendicular to the axis thereof, a reflective mirror. The principle of operation of the pulsed reflection mode is briefly described as follows.

Initially, the reflectivity of one end of the ruby rod is set at a value substantially equal to unity. The other end of the ruby rod is rendered completely absorptive. The effective reflectivity of each end of the ruby can be regulated by polarization devices located intermediate the end of the ruby rod and the mirror which are effective to interrupt the light energy transmission path at predetermined intervals.

With the reflectivities set as described above, the ruby rod is pumped to accomplish the aforementioned population inversion necessary to the production of stimulated emission. When the population inversion has reached a predetermined level, the polarization device is regulated to allow the output beam to reach the mirror. The effect is then to switch the reflectivity of this end of the ruby rod back to a value nearly equal to unity. Under these conditions, only a small population inversion is required to sustain the regeneration process since the photons which are spontaneously emitted by the excited ions will induce emission of additional photons to perform the light wave build-up as described previously. Thus, the number of ions in the metastable state which go through a radiative transistion to the ground level will increase until the population inversion has decayed to a very low ratio within a very short time. Due to the fact that each of the ions in the metastable state, upon returning to the ground level, emits a photon, it can be seen that while the population of excited ions decreases, the density of the laser radiation grows to a high value. The effect of this procedure is to induce a very rapid population inversion decay with a coincident concentration in the output power of the ruby rod.

It is the object of this invention to improve upon the pulsed reflection mode of laser operation to further decrease the output pulse width and thereby increase the power concentration in the output of the ruby rod. The improved mode shall be known as the pulsed transmission mode of laser operation.

Briefly, the pulsed transmission mode of laser operation is accomplished as follows. An active material, such as ruby, is pumped to produce the above-described population inversion while the resonant chamber, which includes the active material, is in a condition relatively unsuited for regenerative action. At approximately the peak of the population inversion, the resonant chamber is conditioned for regenerative action. As spontaneous emission of radiation begins, the regenerative effect within the active material causes induced emission with a steady build-up of radiation energy in the material. This radiation build-up is accompanied by a steady decrease in the population inversion ratio. At some point near the peak of the radiation energy curve, the resonant chamber is again conditioned unfavorably to regenerative action and the peak radiation energy is coupled out of the resonant chamber in a relatively short time with no further regenerative action taking place.

The invention may be more readily understood by referring to the following description of an illustrative means for practicing the invention, taken with the accompanying drawings of which:

Figure 1:
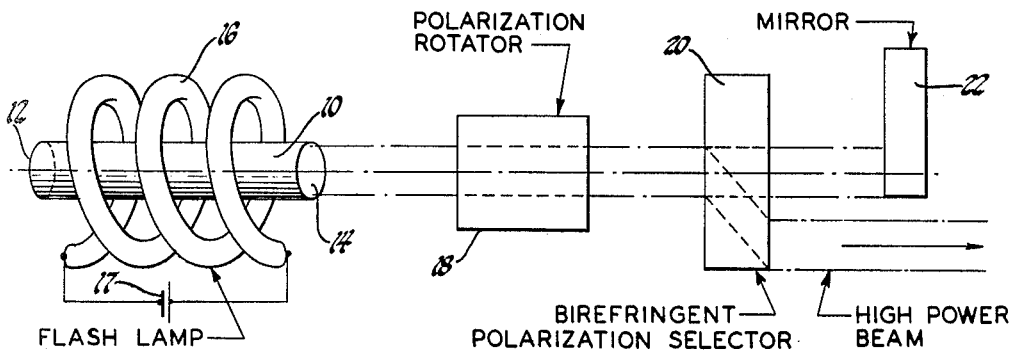
FIGURE 1 is a block diagram illustrative of apparatus for practicing the invention.

Referring to FIGURE 1, there is shown a cylindrical ruby rod 10 having the opposite surfaces 12 and 14 thereof ground optically flat and perpendicular to the axis of the rod 10. Surface 12 is maintained at a value of reflectivity substantially equal to unity. This may be accomplished by the evaporation of silver on the surface 12 of the rod or by a dielectric coating. Surface 14 is unsilvered so as to couple out a maximum percentage of light energy generated within the rod 10. Surrounding the rod 10 is a flash lamp 16 which is connected across a power source 17. This combination provides the pump power for the laser operation. It is to be understood that the combination of the flash lamp 16 and the source 17 is a sufficient source of radiant energy to be capable of raising an elevated number of chromium ions to the required energy state.

Due to the regenerative action in the rod 10, the output beam from the rod 10 is confined to a direction along the longitudinal axis of the rod 10 and is polarized in a direction normal to the axis of the rod. Located in the path of the beam, that is, coaxial with the rod 10, is a polarization rotator 18. The polarization rotator 18 may be, for example, a Kerr cell, and is effective to rotate the direction of polarization of the polarized radiation from the rod 10 through a predetermined angle, for example, 90°. Also located coaxially with the rod 10 and the rotator 18 is a birefringent polarization selector 20. The polarization selector 20 may take the form of a birefringent crystal, such as Iceland Spar ($CaCo_3$) with the optical axis of the selector 20 aligned to allow an undeviated transmission of the laser radiation when the polarization thereof is in the unrotated direction. Also located in the path of the beam from the rod 10 is a mirror 22, the reflectivity of which is unity. It will be seen that the undeviated laser radiation, i.e., that produced when the polarization rotator 18 is off, will be transmitted to the mirror 22 with the effect being substantially the same as if the surfaces 12 and 14 of the rod 10 were both highly reflective. However, when the polarization rotator 18 is on, the direction of polarization of the output beam will be rotated at right angles to the normal direction of polarization and, thus, the beam will be laterally displaced by the selector 20 so as to bypass the mirror 22.

Figure 2:
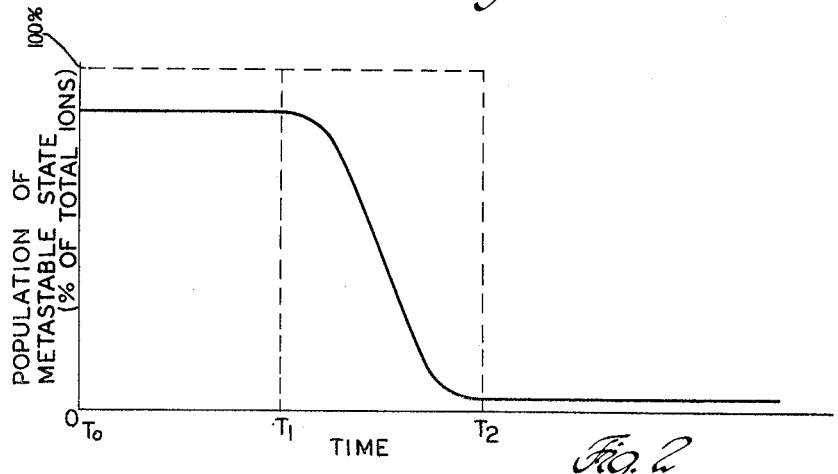
FIGURE 2 is a plot of the percent of ions in the active material which are in the metastable energy state at any time in the laser cycle.
Figure 3:
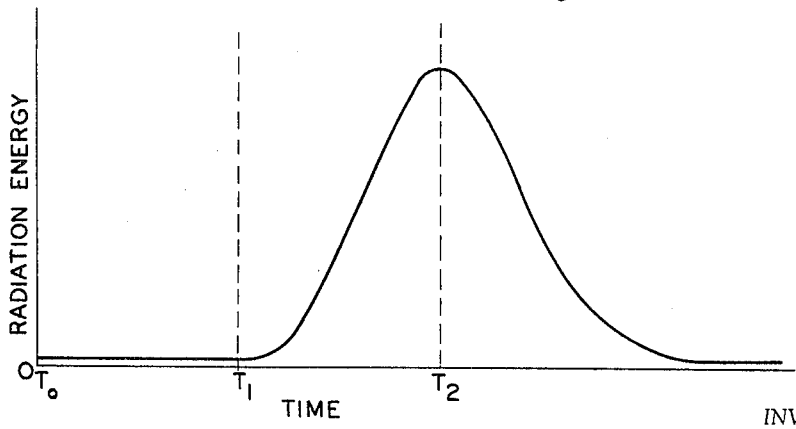
FIGURE 3 shows the radiation energy level in the active material plotted as a function of time.

Discussing the operation of the apparatus shown in FIGURE 1, reference may also be taken to the curves of FIGURES 2 and 3. The invention may be practiced by alternately switching the polarization rotator 18 on and off at predetermined times to thereby control the reflectivity of one end of the resonant chamber. As indicated, this is accomplished through the process of deviating the laser beam so as to bypass mirror 22 for predetermined portions of the laser cycle.

The laser cycle is begun by triggering the flash lamp 16 to irradiate the rod 10 and to produce the population inversion in the manner described above. Referring to FIGURE 2, it may be seen that at time $T_0$, approximately 80° of the chromium ions have been excited to the metastable energy state. As indicated in FIGURE 3, the radiation energy level in the rod 10 is substantially zero, since before time $T_0$ the regeneration in the laser path is low, the path not including the mirror 22. At time $T_0$, the polarization rotator is turned off such that light energy traversing axially through the rod 10 will not be deviated by the analyzer 20, but will encounter the highly reflective surface of the mirror 22. As described, surface 12 is also highly reflective and, thus, a resonant chamber exists between surface 12 and the mirror 22 when the polarization rotator 18 is completely switched off. This turning-off process generally requires a given period of time. In addition, the resonant chamber has a response time. Thus, the system will not respond to the new conditions until a time $T_1$. After time $T_1$, photons emitted in a direction substantially coaxial with the rod 10 will be able to make many traversals of the rod and the stimulated or induced emission process will be greatly enhanced. Referring again to FIGURE 2, it may be seen that the population of ions in the metastable state begins to rapidly decrease as the induced emission process gathers momentum. Correspondingly, it may be seen in FIGURE 3 that the radiation energy level within the rod 10 rapidly increases toward a peak value.

At time $T_2$ the population of ions in the metastable state has reached a minimum value and the radiation level has increased to a peak as shown in FIGURES 2 and 3, respectively. At this time, the polarization rotator 18 is switched on. Thus, the direction of polarization of the beam from the rod 10 is rotated through an angle of 90°. Under these conditions the polarization selector 20 will be effective to refract or laterally displace the output beam such that the beam does not encounter the reflective surface of mirror 22. It may be seen that since the axially emitted light energy is no longer reflected back into the rod 10, the light transmission path no longer constitutes a resonant chamber and the regenerative effect ceases. This does not effect the population distribution as shown in FIGURE 2. However, the radiation energy level is severely affected and the decay time of the existing radiation is decreased markedly. The result is an extremely short pulse of high powered radiation emanating directly from the rod 10. It will be seen that the laser beam is not coupled out of the rod 10 through a highly reflective surface such as the mirror 22 but is coupled directly out of the rod 10 being limited only by the reflective and absorptive properties of the surface 14.

It is to be understood that the off-on-off progression which has been described for the operation of the polarization rotator 18 may be reversed simply by relocating the mirror 22. It is to be further understood that the invention described herein is not limited to the illustrative embodiments shown in FIGURE 1, but may be accomplished by numerous methods of implementation as will be apparent to those skilled in the art. For a definition of the invention, reference should be had to the appended claims.

What is claimed is:

1. A method of producing a high intensity beam of coherent radiant energy comprising the steps of:

non-regeneratively pumping energy into a body of active laser material to establish a population inversion by exciting a predetermined population of ions from a ground energy state to an elevated energy state from which energy transitions of the ions to the ground state are accompanied with radiation of energy of a characteristic frequency;

conditioning a resonant chamber including the body of active material for radiant energy regeneration along a predetermined axis thereof within a frequency range including the characteristic frequency, whereby the radiant energy within the body increases toward a maximum value;

substantially fully deconditioning the resonant chamber from radiant energy regeneration when the radiant energy reaches said maximum value;

and coupling the radiant energy out of the resonant chamber in a direction corresponding to the predetermined axis.

2. A method of producing a high intensity beam of coherent radiant energy comprising the steps of:

irradiating an element of active laser material of predetermined geometry to establish a population inversion by exciting a large population of ions from a ground energy state to an elevated energy state from which energy state transitions of the ions to the ground energy state are normally accompanied with radiation of energy of a characteristic frequency;

enclosing the active material between parallel end surfaces which are reflective to the radiant energy to define a resonant chamber having an operating range including the characteristic frequency and including the active material element until the radiant energy within the material increases to a maximum value;

effectively minimizing the reflectivity of one of the reflective end surfaces of the resonant chamber when the radiant energy level reaches said maximum value thereby to substantially fully decondition the chamber from resonance;

and coupling the radiant energy out of the active element.

3. The method of producing a concentrated pulse of coherent radiation from a laser comprising the steps of:

deconditioning a body of active laser material of predetermined geometry from radiant energy regeneration along an axis thereof;

irradiating the element to establish a population inversion by raising a large population of ions to a metastable state;

conditioning a resonant chamber including the body of active material for radiant energy regeneration along the said axis until the radiant energy within the body reaches a maximum value;

and opening one end of the chamber when said radiant energy has achieved said maximum value to decondition the chamber from regeneration and to release the radiant energy therein.

References Cited by the Examiner

UNITED STATES PATENTS 3,140,451  7/1964  Fox _____ 331—94.5

FOREIGN PATENTS 608,711  3/1962  Belgium.

OTHER REFERENCES

Marshall et al.: "Use of Electro-Optical Shutters to Stabilize Ruby Laser Operation," Proceedings of the IRE, vol. 50, No. 12, page 2108, October 1962.

DAVID H. RUBIN, *Primary Examiner.*

RONALD L. WIBERT, *Examiner.*

L. ORLOFF, *Assistant Examiner.*